United States Patent
McCutchen et al.

(10) Patent No.: US 8,961,667 B2
(45) Date of Patent: Feb. 24, 2015

(54) RADIAL COUNTERFLOW MUFFLER FOR NO REDUCTION AND POLLUTANT COLLECTION

(75) Inventors: David J. McCutchen, Portland, OR (US); Wilmot H. McCutchen, Orinda, CA (US)

(73) Assignee: McCutchen Co., Portland, OR (US)

( * ) Notice: Subject to any disclaimer, the term of this patent is extended or adjusted under 35 U.S.C. 154(b) by 207 days.

(21) Appl. No.: 13/364,247

(22) Filed: Feb. 1, 2012

(65) Prior Publication Data

US 2012/0193221 A1    Aug. 2, 2012

Related U.S. Application Data

(60) Provisional application No. 61/438,596, filed on Feb. 1, 2011.

(51) Int. Cl.

| *F01N 5/04* | (2006.01) |
| *F01N 3/01* | (2006.01) |
| *F01N 3/037* | (2006.01) |
| *F01N 1/18* | (2006.01) |
| *B01D 53/32* | (2006.01) |
| *C25B 9/12* | (2006.01) |
| *F01N 1/08* | (2006.01) |
| *F01N 3/08* | (2006.01) |

(52) U.S. Cl.
CPC *F01N 5/04* (2013.01); *F01N 1/083* (2013.01); *F01N 1/18* (2013.01); *F01N 3/01* (2013.01); *F01N 3/0892* (2013.01); *B01D 53/326* (2013.01); *C25B 9/125* (2013.01); *F01N 2240/34* (2013.01); *Y02T 10/16* (2013.01); *Y02T 10/20* (2013.01); *B01D 2257/404* (2013.01)

USPC ............... 96/386; 55/442; 204/248; 205/615

(58) Field of Classification Search
None
See application file for complete search history.

(56) References Cited

U.S. PATENT DOCUMENTS

| 1,109,702 A | 9/1914 | Reetz |
| 1,096,601 A | 5/1915 | Charbonneau |
| 2,003,500 A | 6/1935 | Corless |
| 2,479,165 A | 8/1949 | Jackson |

(Continued)

OTHER PUBLICATIONS

Vorsana, Inc., Vorsana Gas Scrubber: Continuous Carbon Capture and Flue Gas Scrubbing. Feb. 20, 2009. http://www.vorsana.com/images/Vorsana_Gas_Scrubber.pdf, pp. 1-3.

(Continued)

*Primary Examiner* — Harry D Wilkins, III
(74) *Attorney, Agent, or Firm* — Marger Johnson & McCollom, PC

(57) ABSTRACT

A scrubbing muffler for internal combustion engines comprises coaxial counter-rotating disk pairs stacked in a cascade. Acoustic pulses are attenuated by doing work and dissipated by the circuitous path through the dynamic cascade. A motor and/or Venturi effect from slipstream over a vehicle assists exhaust and reduces backpressure for greater fuel economy. Exhaust gas fed at the axis is sheared between the disks of the first stage of the cascade as it passes radially outward into a shrouding tank disposed about the cascade. Vortex rebound at the tank wall advects flow radially inward back through the workspace between the first stage disks to axial extraction as feed for the second stage of the cascade. N2 and H2O, along with CO and NO, can pass radially inward to successive stages. Soot and $CO_2$ stay in the tank. NO and CO are reduced at a Faraday disk cathode.

20 Claims, 8 Drawing Sheets

(56) References Cited

U.S. PATENT DOCUMENTS

| | | | |
|---|---|---|---|
| 2,518,869 A | | 8/1950 | Corless |
| 2,958,506 A | | 11/1960 | Chimento |
| 4,068,987 A | * | 1/1978 | Crooks ............ 418/181 |
| 4,201,635 A | * | 5/1980 | Muller ............ 205/339 |
| 4,823,549 A | | 4/1989 | Moser |
| 4,969,328 A | * | 11/1990 | Kammel ............ 60/275 |
| 4,970,859 A | | 11/1990 | Yates et al. |
| 5,050,377 A | | 9/1991 | Eng |
| 5,135,551 A | | 8/1992 | Fielding |
| 5,343,970 A | * | 9/1994 | Severinsky ........ 180/65.25 |
| 5,722,235 A | | 3/1998 | Cumins |
| 6,138,781 A | * | 10/2000 | Hakala ............ 180/2.2 |
| 6,343,673 B1 | | 2/2002 | Chang |
| 6,471,918 B1 | | 10/2002 | Sherwood |
| 6,702,631 B2 | | 3/2004 | Jordan |
| 7,331,422 B2 | | 2/2008 | Wall |
| 7,516,609 B2 | | 4/2009 | Agnew |
| 7,901,485 B2 | | 3/2011 | McCutchen |
| 2007/0193254 A1 | | 8/2007 | Johannes |
| 2008/0264251 A1 | * | 10/2008 | Szepessy ............ 95/35 |
| 2009/0013867 A1 | * | 1/2009 | McCutchen ............ 95/35 |
| 2009/0173623 A1 | * | 7/2009 | Kato ............ 204/270 |
| 2009/0200176 A1 | | 8/2009 | McCutchen et al. |
| 2009/0275120 A1 | | 11/2009 | Koch et al. |

OTHER PUBLICATIONS

International Search Report dated May 3, 2012 corresponding to International Patent Application No. PCT/US2012/023554.

Huang, A. et al., Using electrostatic precipitation to control diesel exhaust particulate emissions; 12th U.S./North American Mine Ventilation Symposium 2008—Wallace (ed) ISBN 978-0-615-20009-5, pp. 515-519.

Rigo, H. et al. Retrofit of Waste-To-Energy Facilities Equipped with Electrostatic Precipitators, vol. 1: Report; NREL/TP-430-21125, Apr. 1996.

* cited by examiner

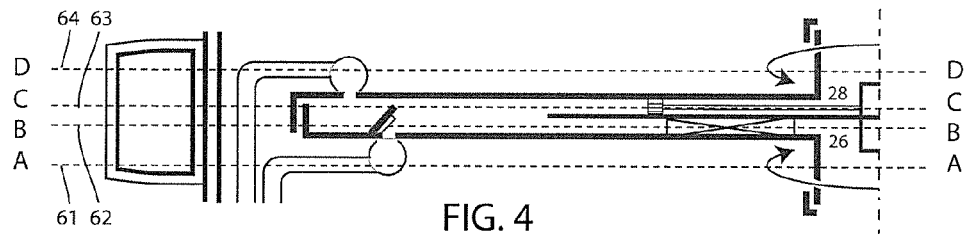
FIG. 4
FIG. 5
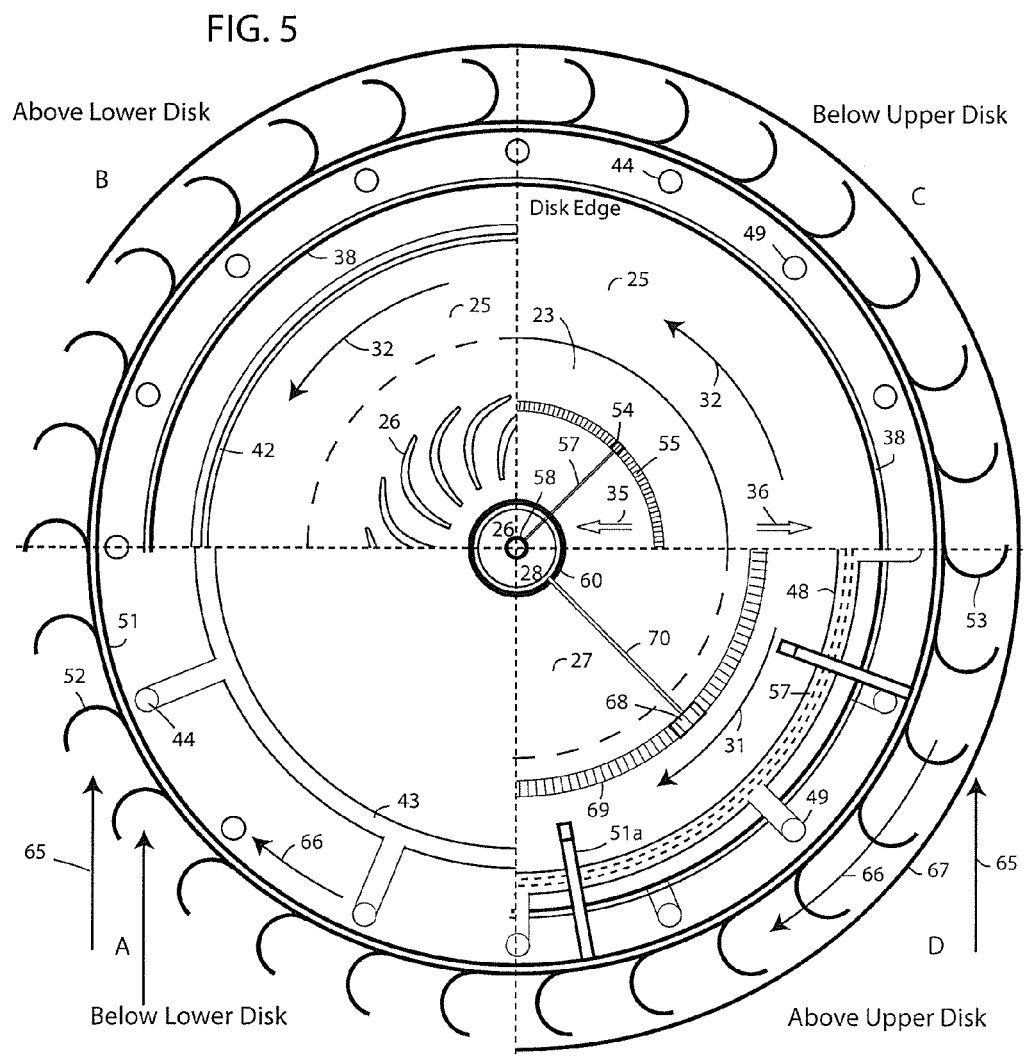

Compressed soot

Stored CO₂

Counter-rotating plate stack gas processor
All hatched components within dashed line
are a single assembly which rotates together

RADIAL COUNTERFLOW MUFFLER FOR NO REDUCTION AND POLLUTANT COLLECTION

APPLICATION HISTORY

The applicants claim priority based on U.S. Provisional Application 61/438,596 filed Feb. 1, 2011.

BACKGROUND

1. Technical Field

The present disclosure relates to mufflers and means for diminishing the noise and emissions of internal combustion engines such as catalytic converters and soot collectors. It also relates to electrolytic reduction of nitric oxide (NO) and to collection of soot and carbon dioxide from internal combustion engines.

2. Prior Art

Internal combustion engines produce exhaust streams which contain pollution and noise. Mufflers have been used to reduce the noise out of the exhaust pipe, but the mufflers do not capture the pollution in the exhaust stream, and reduce fuel efficiency by causing backpressure.

Noise from internal combustion engines results from acoustic pulses of the engine exhaust stream. These acoustic exhaust pulses conventionally are dissipated by a muffler, which conventionally is a static device which forces the exhaust gas to flow through a tortuous path among baffles. The acoustic pulses of hot and dirty exhaust from the engine, which otherwise would produce a loud sound out of the exhaust pipe, are broken up and their linear momentum becomes diffused in isotropic turbulence. Backpressure due to this isotropic turbulence in the tortuous flow path means that the engine must work harder to push the exhaust through to discharge, raising the fuel requirements and increasing the heat and wear on the engine. A need exists for a way to reduce backpressure without increasing noise out of the exhaust pipe.

The faster an exhaust pulse moves, the better it can suck out the spent gases during valve overlap, called exhaust pulse scavenging. Because conventional muffler design obstructs flow, exhaust gas pulses cannot move fast enough to create low pressure wakes to evacuate the cylinders and accomplish exhaust pulse scavenging.

Reetz, U.S. Pat. No. 1,109,702 (1914) and Jackson, U.S. Pat. No. 2,479,165 (1949) teach a rotatable baffle comprising helical blades and having an axis of rotation along the path of flow into and out of the muffler (axial exhaust flow). Chang, U.S. Pat. No. 6,343,673 (2002) teaches a multibladed turbine having its axis of rotation along the axial exhaust flow path through the turbine blades.

Corless, U.S. Pat. No. 2,003,500 (1935) and U.S. Pat. No. 2,518,869 (1950), teaches a rotatable baffle actuated by exhaust flow radially inward to its axis of rotation. Chimento, U.S. Pat. No. 2,958,506 (1960) also teaches a radial flow turbine. These radial flow turbine references teach an impulse turbine fed at the rotor periphery by engine exhaust. Wall, U.S. Pat. No. 7,331,422 (2008) teaches a vortex muffler having a stationary fan disposed along an axial flow path for imparting swirl to an exhaust gas stream and thereby assisting discharge into the atmosphere.

Cumins, U.S. Pat. No. 5,772,235 teaches deflectors for lowering the pressure in the exhaust stream. Yates et al., U.S. Pat. No. 4,970,859 teaches a deflection shield which has the effect of lowering the pressure in the exhaust system and directing the exhaust soot away from a truck cab.

Soot, $CO_2$, and NOx (mainly nitric oxide, NO) as well as metals and volatile organic compounds (VOCs), such as polycyclic aromatic hydrocarbons, BTEX and formaldehyde, are pollutants in the exhaust gas stream from gasoline or diesel internal combustion engines. Natural gas internal combustion engines also have $CO_2$ and NOx pollution.

Nitric oxide is thermodynamically unstable, so its reduction to form harmless $N_2$ and $O_2$ only takes a little energy input. Conventionally nitric oxide is reduced to $N_2$ and $O_2$ by catalytic converters comprising platinum, an expensive metal. Urea is another way, but it entails a chemical process which adds weight and occupies space. A need exists for an alternative to precious metal catalytic converters for reducing nitric oxide in vehicle exhaust.

Soot includes diesel particulate emissions. Particulate emissions cannot be filtered from vehicle exhaust streams economically because of the large pressure drop through any dead-end filter. Dead-end filtration adds yet another flow impedance with consequent backpressure and loss of fuel efficiency, and filters tend to clog, requiring frequent replacement. A need exists for a way to capture and concentrate soot from exhaust in a continuous process.

Carbon dioxide in the exhaust streams of cars and trucks is a major contributor to the accumulation of carbon dioxide in the atmosphere, which has implications for global climate. Amine scrubbing and cryogenic distillation are unsuitable for carbon dioxide capture in vehicles, and membrane filters are not feasible due to the soot and water in the exhaust gas. Again, dead-end filters such as membranes entail a large backpressure which reduces fuel efficiency.

Most of exhaust gas is harmless $N_2$ and water vapor (collectively referred to as "nitrogen ballast") so stripping the nitrogen ballast would concentrate the pollutants and thus aid collection and treatment of the noxious constituents, such as soot, $CO_2$ and nitric oxide. Nitrogen gas ($N_2$) has a molecular weight of only 28 g/mol, and $H_2O$ is lighter still, at 18 g/mol, while $CO_2$ is 44 g/mol, $NO_2$ is 46 g/mol, and soot is much denser than these gases. VOCs are also relatively heavy gases. This task is aided by the difference in molecular weight of the constituents of exhaust gas, which allows for centrifugal gas separation in the open von Karman geometry. See McCutchen, U.S. Pat. No. 7,901,485 (2011).

SUMMARY

In an embodiment, exhaust gas from an internal combustion engine is fed through an axial feed port and radially expanded through a radial workspace between opposed coaxial counter-rotating disks. Vanes on the turbines define channels through which the feed flows radially outward, diffusing its momentum into the turbines. Counter-rotation of the turbines creates a shear layer between them, and in this shear layer a sink flow is radially inward toward the turbines' common axis of rotation. A shrouding wall disposed about the periphery of the turbines rebounds nitrogen ballast radially inward through the shear layer to axial extraction into a succession of stages in a cascade.

Heavier constituents, such as soot, $CO_2$, and $NO_2$, are collected from the periphery of the disks. $N_2$ and $H_2O$, because of their lesser molecular weight, flow through the shear layer radially inward and are extracted through an axial extraction port. Nitric oxide (NO) flows with the nitrogen ballast radially inward and up through the cascade because its molecular weight (30 g/mol) is approximately the same as $N_2$ (28 g/mol). The NO, having been separated from the $CO_2$ and other pollutants, is then reduced by electrolysis.

For electrolysis, rotation of at least one disk through an axial magnetic field turns an annular portion of the disk downstream in the cascade into an electrode (cathode) for reduction of NO. Because most of the $CO_2$ has been previously separated out and collected in the shrouding tank, this cathode will is less likely to produce carbon monoxide in the final output stream.

Feed of exhaust gas from an internal combustion engine is continuous through an axial feed port in one turbine/impeller disk, and the extraction of the nitrogen ballast (and NO) is through an axial extraction port in the other disk. A baffle separates the axial feed port from the axial extraction port. A cascade of such devices, each stage in the cascade fed by the axial extraction port of an upstream device, provides means for absorbing the momentum of the exhaust gas and performing complete gas and particulate separation. Acoustic pulses are converted to motive force for the counter-rotation of the turbines of the cascade, so the noise from the engine is dissipated not in the isotropic turbulence of a conventional muffler but in the anisotropic turbulence of this dynamic cleaning muffler.

A long residence time in the workspace effectively separates pollutants from the nitrogen ballast. Centrifugal separation occurs in vortices forced in the shear layer between the turbines, and multi-scale coherent structures in the shear layer integrate the tiny separation effects of these vortices and allow for the continuous extraction of nitrogen and water vapor from the exhaust gas, thus concentrating the soot, $CO_2$, $NO_2$ and VOCs, which collect in the periphery of the disks.

The soot is concentrated, while the carbon dioxide can go into a separate peripheral gas vent. Electrostatic charge attracts soot to a screen over a hopper which is charged as an anode, as in a conventional electrostatic precipitator. The soot concentrates at the periphery of the turbines and at the wall of the shrouding tank, eventually migrating down through the charged screen and into a hopper. The captured carbon dioxide is clean and concentrated enough to be compressed for later disposal.

A motor assists exhaust flow through the cascade, and under some circumstances the motor becomes a generator, for example in long-haul trucks, harvesting power to run cooling equipment or compressors for $CO_2$.

Counter-rotating disks such as this can be turned by a motor, by vanes driven by the passing wind outside a vehicle, or by the energy contained in the exhaust stream.

BRIEF DESCRIPTION OF THE DRAWINGS

FIG. 4 shows this cross section with indications of the locations of the four lateral cross section planes shown in composite in FIG. 5.

FIG. 5 shows a composite of the four cross sectional planes indicated in FIG. 4, starting in the lower left and going clockwise, with the view looking downward in each case.

DRAWING REFERENCE NUMERALS

Figure 1:
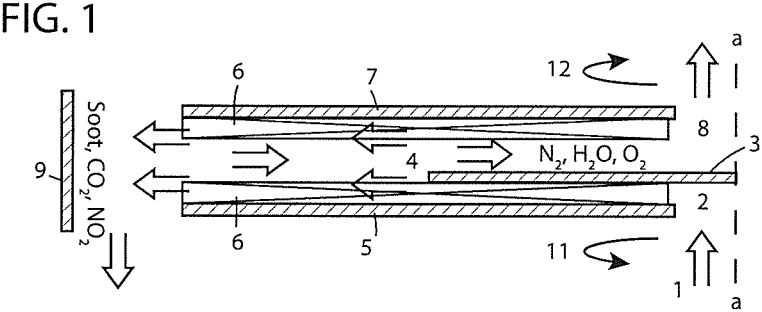
FIG. 1 shows a cross section of the left half of a single pair of counter-rotating radial turbines.

1 Exhaust gas input stream from engine
2 Axial feed port
3 Baffle
4 Workspace
5 Lower radial turbine
6 Vane
6a Impeller vane
7 Upper radial turbine
8 Axial extraction port
9 Shrouding wall
10 Input conduit
11 First rotation direction
12 Second opposite rotation direction
13 Central drive spindle
14 Motor
15 Soot hopper
16 Conductive disk
17 Magnet
18 Cathode
19 Outlet of shrouding tank
20 Atmospheric outlet stream
21 Exhaust gas input stream
22 Intake vent
23 Baffle
24 Workspace
25 Lower disk
26 Axial intake port
27 Upper disk
28 Axial outlet port
29 Axial outlet vent
30 Axial outlet stream
31 Motion of upper disk
32 Motion of lower disk
33 Inlet screw pump
34 Outlet screw pump
35 Lighter constituents
36 Heavier constituents
37 Axis of rotation
38 Periphery
39 Angled annular deflector wall
40 Embedded vanes in deflector wall
41 Heavy particulates
42 Outlet in disk for soot
43 Annular soot collection pipe
44 Soot collection vertical pipe
45 Gases on periphery
46 Heavier gaseous elements
47 Opening for peripheral gases
48 Static annular gas collection pipe
49 Gas collection vertical pipe
50 Pad for triboelectric charging 51 Outer casing
51a Rotation linkage
52 Open scoop vane
53 Closed shield vane
54 Inter-disk gear
55 Gear tooth rack on the baffle
56 Vane between baffle and lower disk
57 Rigid shaft for gear
58 Central support shaft
59 Thrust bearings and centering support structure for lower disk
60 Thrust bearings and centering support structure for upper disk
61 Cross section plane A below the lower disk
62 Cross section plane B above the lower disk
63 Cross section plane C below the upper disk
64 Cross section plane D above the upper disk
65 Slipstream from the motion of a vehicle
66 Induced motion of the vanes
67 Windshield
68 Outer gear
69 Outer gear track
70 Outer gear shaft
71 Path of exhaust
72 Vane casing connection to top impeller
73 Soot compression chamber
74 Soot chunks
75 Soot compression motor
76 Main soot collection pipe
78 Gas pump
79 Main gas collection pipe
80 Gas storage tank
81 Driving vane underneath baffle
82 Vane on lower disk
83 Vane on upper disk
84 Vortex
85 Peripheral gap
86 Peripheral shield
87 Enclosing Tank
88 Interior of tank
89 Boundary layer
90 Shear Layer
91 Vortex axis
92 Rotating drum
93 Planetary gears
94 Escape valve
95 Anode
96 Cathode

DETAILED DESCRIPTION

FIG. 1 shows a cross section of the left half of a single pair of counter-rotating radial turbines in the first stage of a cascade. An exhaust gas input stream 1 from an internal combustion engine enters through an axial feed port 2 which is at the center of a lower radial turbine 5. The input stream is partially blocked by a baffle 3, disposed between the axial feed port 2 at the center of the lower radial turbine 5 and an axial extraction port 8 at the center of the upper radial turbine 7. The vanes 6 on the disks can be radial turbine vanes that are actuated by a radially outward flow from the axis of rotation a—a through the workspace 4 between the radial turbines, or they may advect the outward flow when the disk is turned by suitable means, such as a motor. The term radial turbine herein refers to the combination of the disk and one or more vanes, whether the turbine advects or is advected by the flow through the workspace 4.

Each of the disks 5, 7 comprises an array of vanes 6 extending into the radial workspace 4, and in this case the vane 6 attaches the baffle and the lower disk 5 together so they will rotate together. The exhaust gas expands through a radial workspace 4 between the lower disk 5 and an upper disk 7. The opposite curvature of the radial vanes on the turbines causes counter-rotation of the disks 5, 7 in opposite directions 17 and 19 about a common axis of rotation a—a as the exhaust gas expands between them and pushes against the vanes. By doing work turning the disks 5, 7 the exhaust gas loses enthalpy and its acoustic pulses are dissipated so engine noise is abated.

Due to counter-rotation of the coaxial disks 5, 7 a shear layer forms between them in the workspace 4. The shear layer comprises a vortex network for separation of the lighter and heavier constituents of the feed by enhanced centrifugal force in radial counterflow. The heavier constituents including soot, $CO_2$, $NO_2$ and VOCs pass out of the periphery of the disks and into a shrouding tank from which they may be separately extracted. The lighter constituents including the nitrogen ballast, oxygen, water vapor and NO form a sink flow radially inward toward the axis a—a and out of the workspace and through the axial extraction port 8.

The heavy constituents impinge a shrouding tank wall 9 disposed about the periphery of the disks. Backpressure from vortex impingement on the shrouding wall assists the inward sink flow through the shear layer. In contrast to prior art mufflers, backpressure does not go back into the axial feed port but instead it goes over the baffle into the axial extraction port 8. So the backpressure problem of the conventional static muffler is avoided by the open von Karman geometry, and noise is abated. The exhaust gas is expanded and made to do work, so it loses enthalpy and the acoustic pulses are dissipated.

Figure 2:
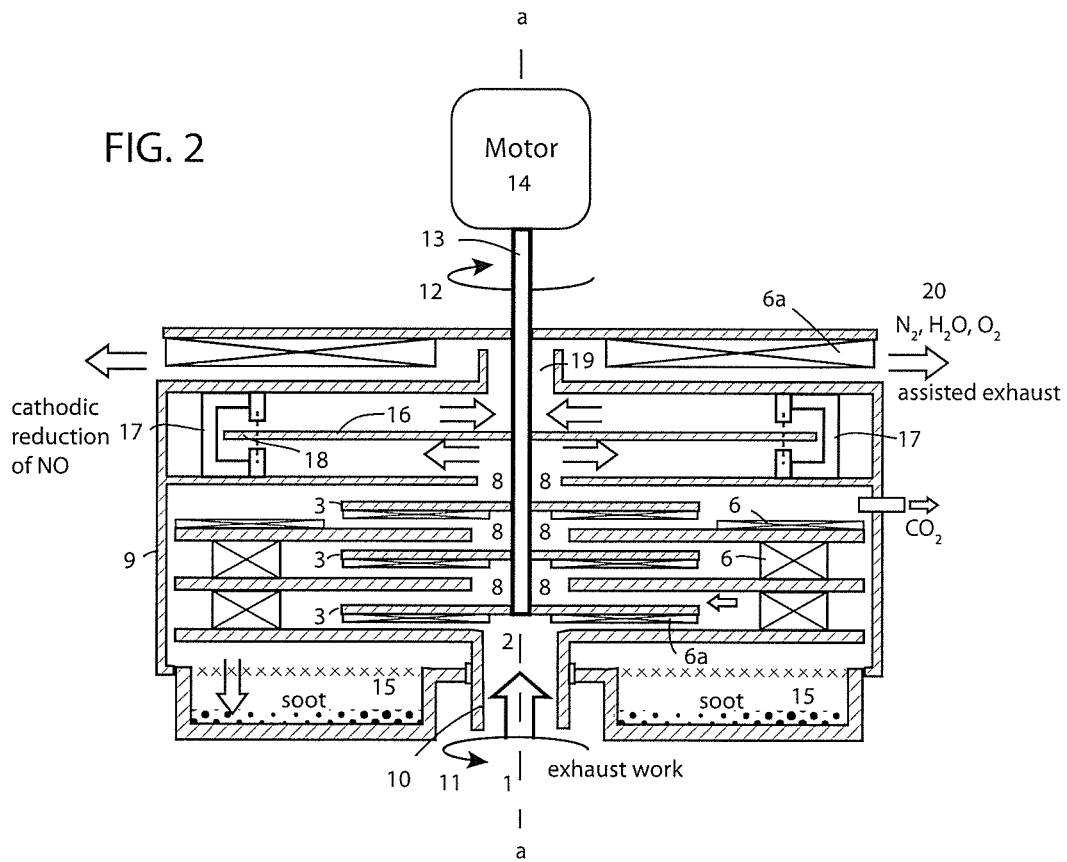
FIG. 2 shows a cross section of a cascade of counter-rotating radial turbines, with a drive motor, and a charged impeller for the cathodic reduction of NO.

FIG. 2 shows a cascade of several disks, plus other elements. An exhaust gas input stream 1 enters through an axial feed port 2 in a rotatable axial feed conduit 10 which forms a lower disk 5. All of the disks above this lower disk it are linked together by vanes 6 so all of the disks of the cascade are co-rotatable in the direction shown by the arrow 11. That includes the upper disk for this stage and for the successive stages. A baffle 3 disposed between the upper and lower disks of each stage is attached to a drive spindle 13 and not to either of the disks. The drive spindle is connected to a motor 14. The baffle of each stage separates its axial feed port 2 and the axial extraction port 8. The baffle rotation direction 12 is opposite to the direction 11 of the rotation of the disks.

The motor 14 also rotates the vanes on a blower which assists exhaust of nitrogen ballast out of the shrouding tank at 19. The motor may be an electric motor, a device connected to the engine, or a device actuated by slip stream over a vehicle. Assisted exhaust reduces backpressure and increases fuel efficiency of the internal combustion engine.

The advection caused by the motor-driven baffles and their vanes 6a extending into the workspace 4 of each of the stages drives the disks in counter-rotation by means of peripheral vanes 6 connecting the disks of the stages.

The heavier products that accumulate at the periphery of the counter-rotating baffles and disks are stored in a receptacle such as the soot hopper 15 and the $CO_2$ outlet in the shrouding tank which leads to tanks and compressors suitable for storing gases.

After the exhaust stream has been stripped of its heavier constituents, the remaining NO and other gases such as CO and CO2 can be cracked by electrolysis at a stage in the cascade. In this stage, a conductive disk 16, here also attached to the drive shaft 13, is rotated through the transverse magnetic field of at least one magnet 17 to form create a Faraday disk, or disk dynamo, having opposite radial currents making the edge of the disk a cathode 18 and the center of the disk an anode. As the NO, CO, and residual $CO_2$ passes over this cathode, both above and below the spinning disk, the molecules dissociate. Harmless $N_2$ and $O_2$ flow out at 19 while elemental carbon deposits on the cathode.

Any residual soot then accumulates at the central anode end of the disk. The anode charge may be used to attract soot to the inlet screen of the soot hopper 15 as in conventional electrostatic precipitators. and this charge can also be used to charge the inlet screen of the soot hopper 15 as an anode.

The light fractions, including the nitrogen ballast, then pass though the central outlet port 19 of the shrouding tank. Slipstream over a muffler mounted on a moving vehicle will also maintain low pressure by the Venturi effect in the outlet of the shrouding tank 19. The result is a safe atmospheric outlet stream 20 of $N_2,O_2$ and water vapor that is released to the atmosphere, without noise.

Under certain conditions, such as long-haul trucking, the slipstream may assist exhaust so much that mass flow through the muffler is sufficient to allow the motor to be used as a generator. In that case, the baffles will be driven by instead of driving the mass flow through the muffler, such that the drive shaft turns a generator. Suitable means for switching the motor 14 to generator mode are available for that possibility.

Figure 3:
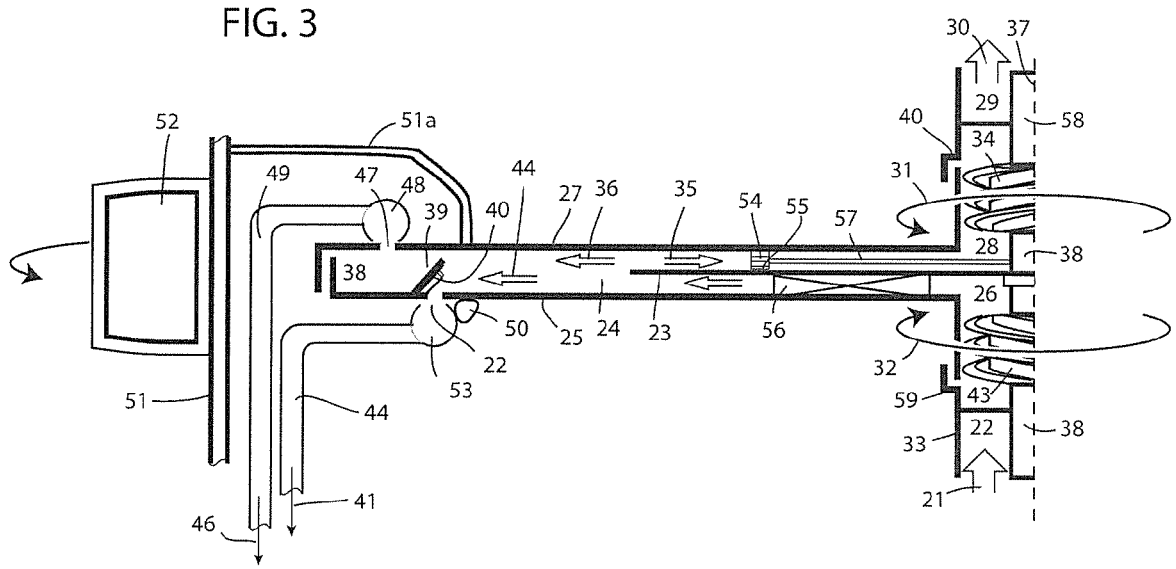
FIG. 3 shows a cross section of the left half of a single pair of counter-rotating radial turbines in an alternate design, with separate soot and carbon dioxide capture conduits.

FIG. 3 shows a cross section of the left half of a single pair of counter-rotating disks featuring more detailed capture of the heavier constituents. The exhaust gas input stream 21 enters through an intake vent 22. The intake flow is partially blocked by a baffle 23 and passes through vanes 56. These vanes either act as turbines to extract mechanical energy from the flow to use for increased disk rotation, or act as impellers, to increase the flow, if the disk rotation is driven by a motor The intake flow then passes into a workspace 24 located between the lower disk 25, which contains an opening 26 for the intake vent 22, and the upper disk 27 which contains an opening 28 for an axial outlet vent 29 for the axial outlet stream 30. The two disks turn in opposite directions, as indicated by 31 for the motion of the top disk and 32 for the motion of the lower disk.

An net positive pressure in the input stream 21 can be the result of the positive pressure created by the engine, and it can be enhanced by an input pump, such as the inlet screw pump 33 incorporated into the intake vent 22, and which turns from the motion 32 of the spinning lower disk 25. Similarly, a net negative pressure in the axial outlet stream 30 can be created by an axial outlet pump, such as the outlet screw pump 34 incorporated into the axial outlet vent 29, which turns from the motion 31 of the spinning upper disk 27. The inlet screw pump 33 and the outlet screw pump 34 serve to assist flow of exhaust out of the engine for improved fuel efficiency. Because the disks are turning in opposite directions, the slope or "handedness" of the screws must be opposite as well, in order to maintain the same upward flow.

In the workspace 24 between the counter-rotating disks 25 and 27, radial counterflow turbulence with a branching network of fine vortices in the shear layer separating the lighter constituents 35, such as oxygen, nitrogen, and water vapor, from the heavier constituents 36 in the exhaust stream, such as soot, NOx, VOCs and carbon dioxide. The lighter constituents 35 such as nitrogen and water vapor are drawn inward through the vortex cores into the axial outlet stream 30 near the axis of rotation 37, and the heavier fractions 36 churn in the workspace 24 until they eventually migrate outward to the periphery 38 of the disks.

For particulates such as soot, an angled annular deflector wall 39 built into the lower disk 25 could direct the stream downward, while at the same time inducing cross-turbulence with embedded vanes in the deflector wall 40. The heavier particulates such as soot, because of their weight and inertia, are left behind and fall downward through an opening in the disk 44 into a static annular soot collection pipe 43 which connects to a descending vertical soot collection pipe 44. At the same time, the heavier gaseous components 46 continue onward and drift upward to a gas opening 47, and beyond that to a static annular gas collection pipe 48 which connects to a descending vertical gas collection pipe 49.

The collection of the soot is preferably enhanced by an electrostatic charge applied to the soot outlet pipe 42. This electrostatic charge can be generated by triboelectric charging means. For example, the static annular soot outlet pipe 42 can be made of polyvinyl chloride (PVC), and a charging element, such as a leather or rabbit fur pad 50 attached to the moving disk rubs against the annular soot outlet pipe 42 to charge it. This charge is regulated by a periodic connection to ground.

Figure 6:
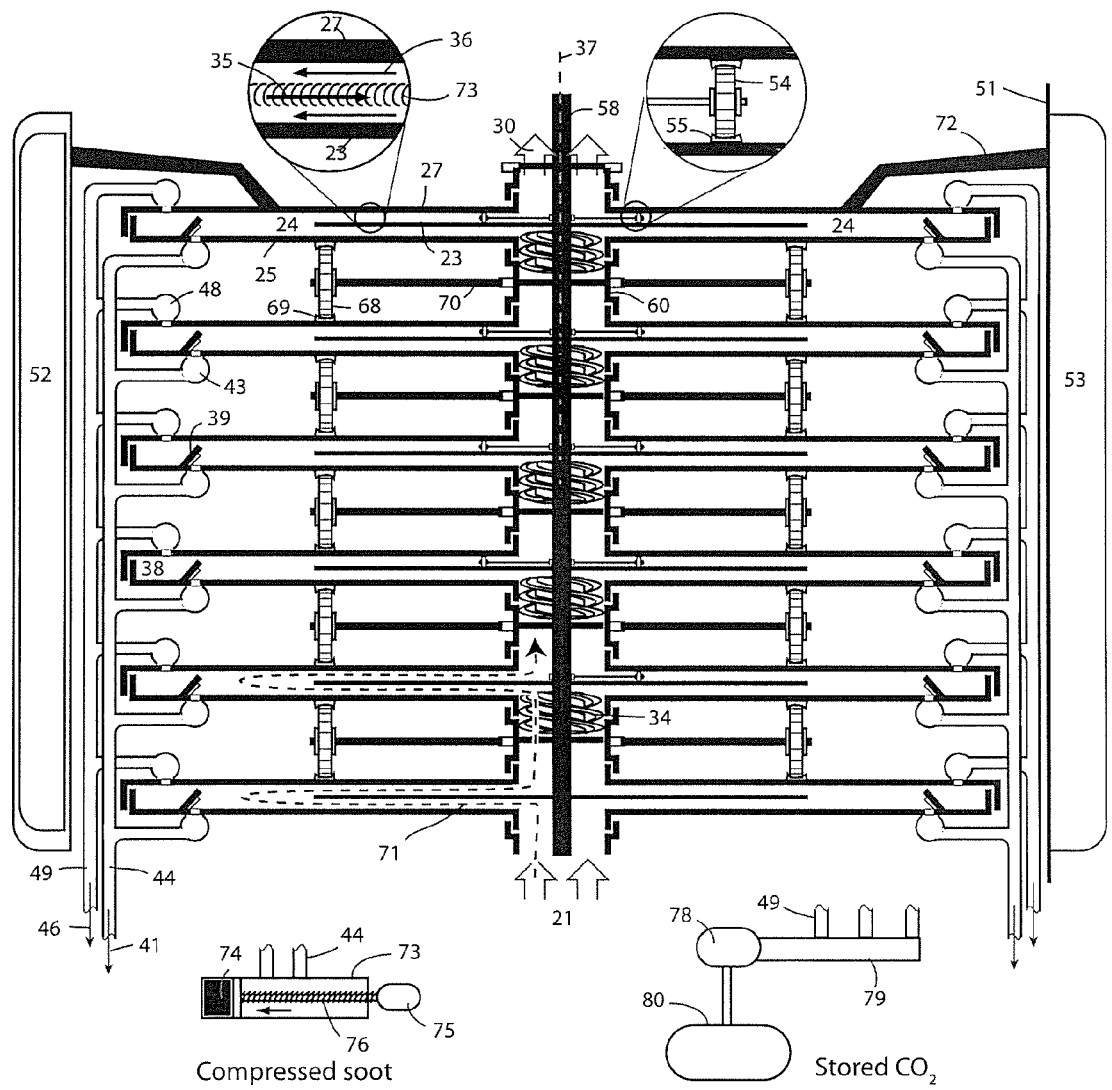
FIG. 6 shows a cross section of a cascade of disks, and an example of the path that the exhaust gas, and the sound vibrations that it contains, travels through them.

The disks can be turned by the action of the flow against turbine vanes, by a motor such as one connected to the central shaft 58, or by an air stream. Here vanes attached to the outer casing 51 and to the upper disk 25 rotate the disk using the air stream passing by a moving vehicle. One example of a turbine for capturing the wind is this design based on a Pelton wheel. The forward-facing open scoop-type vane is at 52. Both the forward-facing open scoop vane 52 and the backward-facing closed vane 53 are shown in FIG. 6 as coupled by a link 51a to the upper disk 27 in order to turn it. The counter-rotation of the lower disk 27 is caused here by inter-disk gears 54 between the disks, engaging a gear tooth track in the upper disk 25 and a gear tooth rack 55 on the baffle 23 with its vanes 56 underneath which couple the baffle to the lower disk. The gears have bearings coupled to a rigid shaft 57 coupled to the central support shaft 58. This central shaft supports the rigid cylindrical support structures containing the central axial intake port 22 for the lower disk and the central exhaust port 29 for the upper disk, as well as the low-friction thrust and roller bearings and centering support structures for the lower disk at 59 and for the upper disk at 60, which allow the disks to rotate freely. The baffle also has a bearing and is centered on this central shaft, and the baffle is linked by the vane 56 to the lower disk so they rotate together.

FIG. 4 shows another cross section of the left half of a single pair of counter-rotating disks shown in FIG. 3, with indications of the locations of the four horizontal cross section planes shown in composite in FIG. 5. The cross section plane A below the lower disk is at 61, the cross section plane B above the lower disk is at 62, the cross section plane C below the upper disk is at 63, and the cross section plane D above the upper disk is at 64.

FIG. 5 shows a composite of the four cross sectional planes indicated in FIG. 4, starting in the lower left and going clockwise, with the view looking downward in each case. The cross section plane A below the lower disk shows the annular soot collection pipe 43 which connects to a descending vertical soot collection pipe 44. The outer casing 51 is coupled to multiple vanes which in their open scoop position 52 can capture the energy of a passing airstream from the motion of a vehicle 65 to induce a rotary motion in the casing and to any disks coupled to it.

The cross section plane B above the lower disk 25 shows the axial intake port 26 and the lower disk 25, with its rotary motion 32, its periphery 38, the soot collection slot 42, and the vanes connecting the lower disk 23 to the baffle 23. Both the slots in the upper and lower disks are not continuous, but have periodic interruptions to maintain the structural integrity of the disk.

The cross section plane C below the upper disk, again looking down, shows the upper surface of the lower disk 25 and its rotary motion 32, and its periphery 38. The baffle 23 has a gear tooth track 55 for at least one inter-disk gear 54, which has a shaft coupled to the rigid central support shaft 58. Outside of the periphery are the alternating vertical pipes for the collection of soot 44 and of heavy gases 49. The counter-flow turbulence between the disks features vortices separating the components, where the lighter constituents 35 go inward and the heavier constituents 36 go outward.

The cross section plane D above the upper disk 27 shows its rotary motion 31, which is the opposite of the rotary motion of the lower disk 32. The heavier gases collection slot 47 is shown underneath the static annular peripheral gases collection pipe 48 which leads to the vertical gas collection pipe 49. The closed shield orientation of the vanes in the outer casing is shown at 53, along with the induced motion of the vanes 66 caused by the passing airstream from the motion of a vehicle 65; the effect of the airstream on the vanes can be increased with a windshield 67 which favors the engagement with the vanes in their open scoop position 52. For a stack of disks such as that shown in FIG. 6 and FIG. 7, other gears between the upper and lower disks would transmit the motion of one disk in counter-rotation to the next. This is shown here with an outer gear 68 which engages an outer gear track 69 on the upper surface of the upper disk, and has a corresponding gear track on the underside of the lower disk. This outer gear 68 is attached by a shaft 70 to the static centering support structure for the upper disk at 60.

FIG. 6 shows a cross section of a cascade of disks, and an example of the path 71 that the exhaust gas, and the sound vibrations that it contains, travels through them. As the pressure waves of various frequencies caused by the engine travel through repeated regions of extreme turbulence, they lose their coherence and strength, and thus the exhaust stream becomes quieter.

The stack of counter-rotation disks can be driven by a motor, or be passively driven by the passing wind motion in turbine vanes. Here a large scoop vane 52 is shown along with its corresponding shield vane 53 in a rotated position. Both are coupled to a rotating casing 51. Through the casing, the scoop vane's energy is coupled through a connection 72 between the casing and the topmost disk 27. From there, the energy is transmitted in turn downward through successive disks in the stack through inter-disk gears such as at 54, and outer gears such as at 68, engaging gear racks inside 55 and outside 69 of the workspace 24. The energy from the pressure of the exhaust stream is also translated into rotary motion through the passage of the stream through the screw pumps such as 34, which also act as turbines to turn the disks. Thus, the speed of rotation of the disks can be determined by how fast the engine is running or how quickly the vehicle is moving.

The soot collected toward the periphery 38 of each of the stacks of disks is channeled into a descending network of pipes. It first goes into an annular static soot collection pipe 43 and outward in a radial soot collection pipe to a vertical soot collection pipe 44, collected into a main pipe leading to a soot compression chamber 73 where it can be compacted for storage into small brick-like soot chunks 74. This compaction can be aided by a motor 75 driving a screw conveyor 76. Because of the combustible carbon, which may include nanotubes, and the unburned fuel in the compressed soot, these compressed soot chunks can have commercial value, which justifies the business activity of collecting them at gas stations.

Similarly, the peripheral gases, including carbon dioxide, are collected by a network of pipes, beginning with a static annular collection pipe 48 leading to descending collection pipe 49. The final collection can be aided by a gas pump 78 between the main collection pipe 79 and the storage tank 80.

The cascade of successive processing shown here will progressively clean the outlet gas stream through stage after stage, until what is released at the top is significantly less polluted than the original gas stream.

Figure 7:
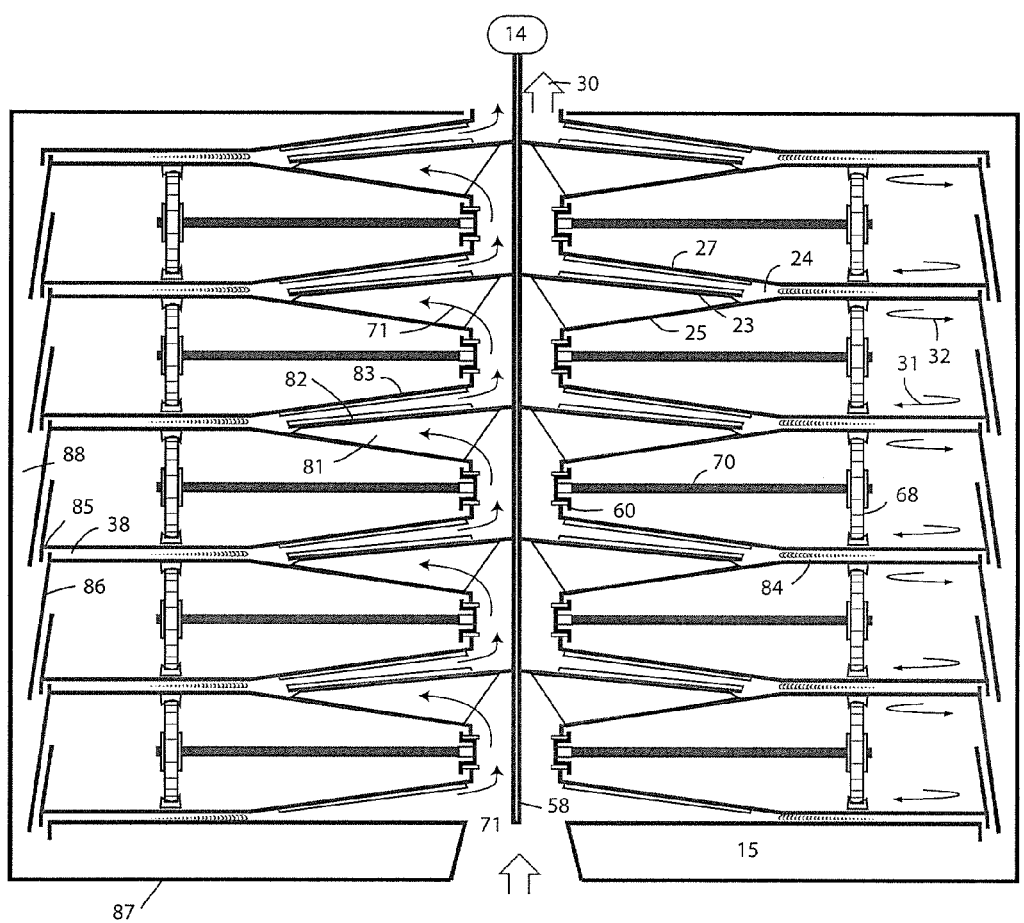
FIG. 7 shows an alternate design with a cross section of a cascade of disks featuring a combined peripheral capture of soot and $CO_2$ within an enclosing shrouding tank, and where the disks are turned by the pressure of the exhaust stream on vanes on the disks.
Figure 8:
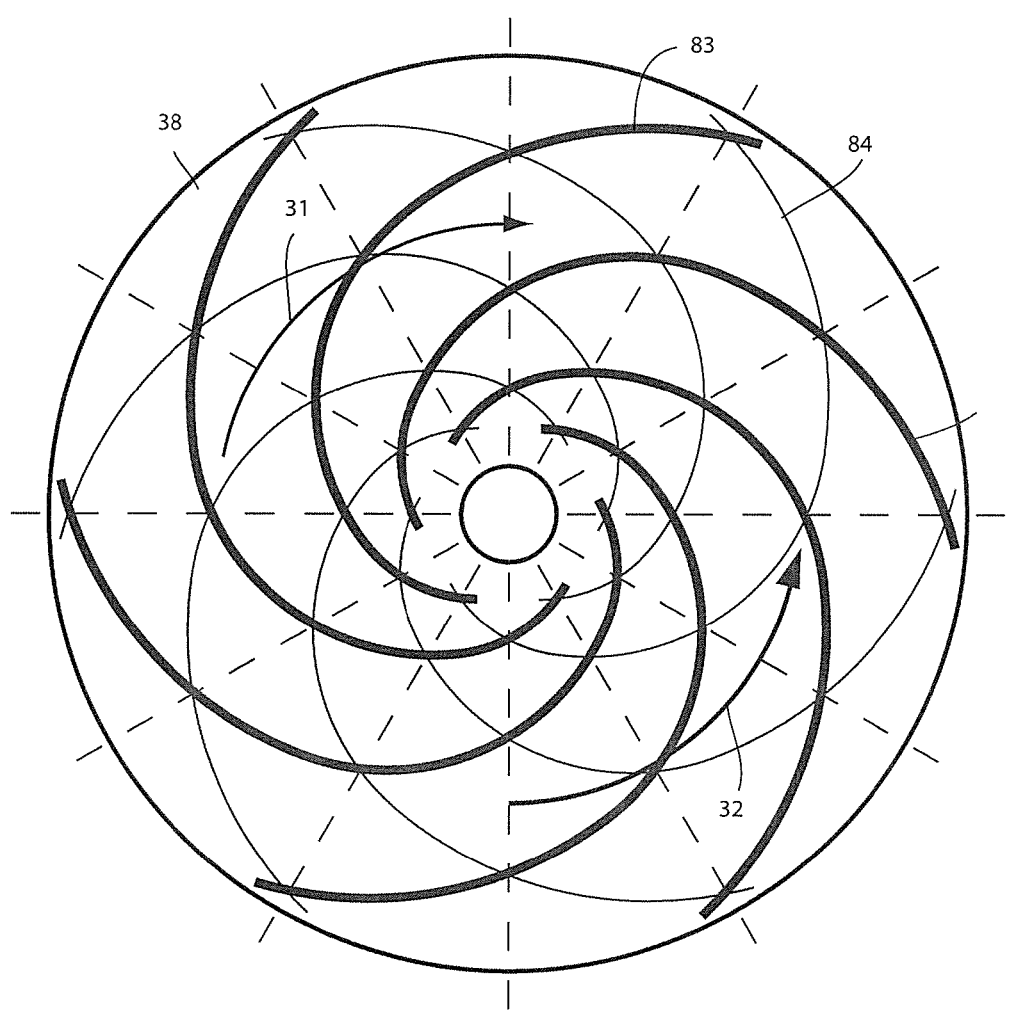
FIG. 8 shows a top view of the vanes from both upper and lower disks superimposed.
Figure 9:
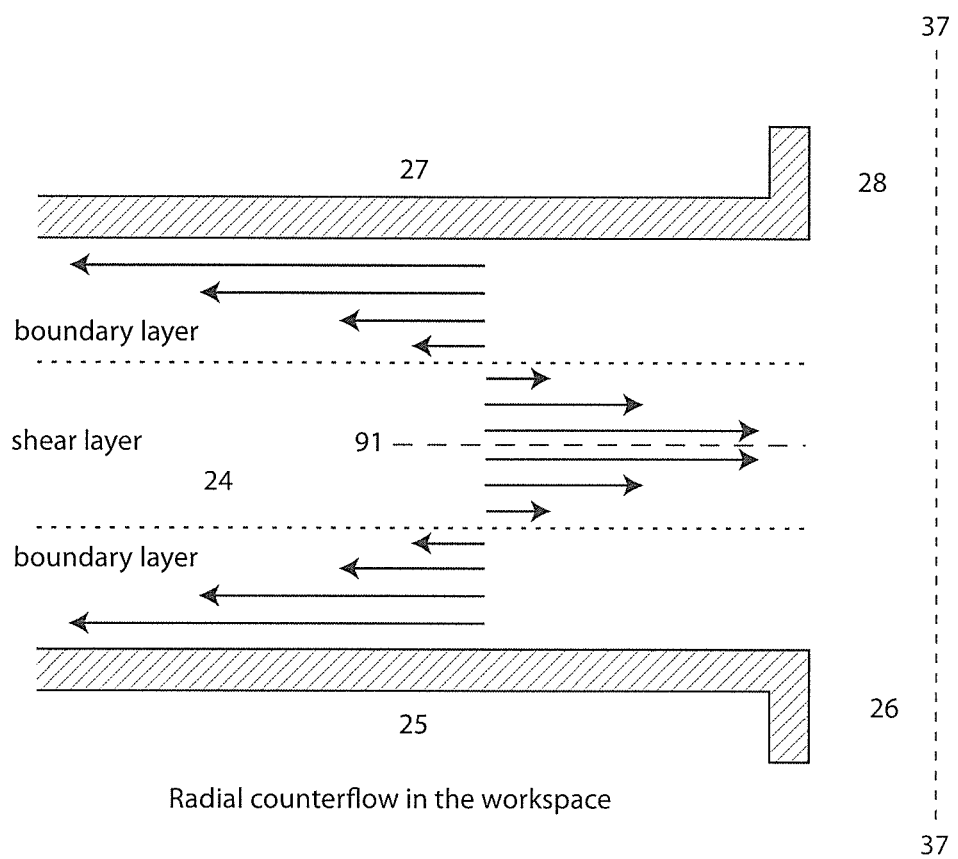
FIG. 9 shows a schematic view of radial counterflow in the workspace between the disks.

FIG. 7 shows an alternate design with a cross section of a cascade of disks featuring a combined peripheral capture of soot and $CO_2$ within an enclosing shrouding tank, and where the disks are turned by the pressure of the exhaust stream on vanes on the disks, optionally assisted by a motor 14 attached to a central shaft. The path of the exhaust stream is shown at 71. The main driving vanes 81 are underneath the baffle 23 and connect it to the lower disk, and other shallow vanes are in the surfaces of the disks, and on the top surface of the baffle. The vane on the lower disk is at 82, and the vane on the upper disk is at 83. The vanes also extend out toward the periphery 38. The pattern of the vanes is shown in FIG. 8. An example vortex in the workspace is shown at 84. More detail about the radial counterflow in the workspace is shown in FIG. 9. The internal exhaust gas pressure with optional assistance from the motor turns the disks in counter-rotation, thereby also evening out the pulses and leading to exhaust pulse scavenging. The motion from the vanes is also transferred in counter-rotation through outer gears 68 engaging outer gear tracks on the outer surfaces of the disks, with the gear shaft 70 anchored to the axial static support and bearing 60. The rotation of this gear transmits the motion of an upper disk 27 to cause the counter-rotating motion of the lower disk 25 in the opposite direction. These opposite directions are shown at 31 and 32. The disks have a peripheral gap 85 which allows for the escape of soot and $CO_2$ which is contained in the interior 88 of an enclosing tank 87. The bottom of the tank can contain the soot hopper 15 and the outlets for captured gases. A peripheral shield 86 prevents the soot from clogging the gear 68, and the small gap at the periphery can be kept clear of accumulated soot by an intermittent element such as a piece of nylon attached to the edges of one disks sweeping the gap clear.

FIG. 8 shows a top view of the scissoring vanes from both upper and lower disks superimposed. The disks 25, 27 are shown in superposition, with the heavier lines such as at 83 representing the vanes on the lower disk, whose motion is shown at 32, and the lighter lines such as at 84 representing the vanes on the opposing upper disk, whose motion is shown at 31. Each disk comprises an array of radial vanes curving away from its direction of rotation, such that rotation advects the exhaust gas stream and heavier components radially outward by both disks simultaneously. In superposition, the radial vanes 83, 84 on the disks intersect at shearing points which are in close opposition but not in contact with each other. These shearing points move out along radial lines (indicated by the dashed lines) as the disks counter-rotate. These lines of high shear sustain the sink flow of the lighter product stream by refreshing the radial vortices, and the periodic shear pulses cause peristaltic pumping of sink flow through the vortex cores. The vortex-wall interaction as swirl collapses where the disks pinch together at the periphery 38 converts the radial vortices generated by the shearing disks into axial jets driving a recirculation flow radially inward toward the axis of rotation. See Shtern and Hussain, "Collapse, Symmetry Breaking, and Hysteresis in Swirling Flows," *Ann. Rev. Fluid Mech.* 31:537-66 (1999), particularly FIG. 1 thereof.

FIG. 9 shows a schematic view of radial counterflow in the workspace 24 between the disks. Laminar boundary layers, where the momentum diffusion from the disks 25, 27 into the exhaust stream occurs, set up against the disks. Radially outward flow of the exhaust stream and the heavier product is forced by momentum diffusion in the boundary layers. A shear layer sets up between the counter-rotating laminar boundary layers. The shear layer comprises radial vortices which act as a sink flow network, into which the lighter gas product stream concentrates and proceeds in sink flow to the axial extraction port 28 which provides a path for the scrubbed exhaust stream out of the workspace, leaving soot, $CO_2$, and NOx behind in a collection tank.

Area-preserving fractal flow networks, such as the root system of trees, are Nature's way of organizing flow with a minimum of pressure drop, in a multi-scale path of least resistance. The open von Karman geometry of the present disclosure allows a fractal flow network in the shear layer. One radial vortex axis is shown as a dashed line 91. Low density fractions in the workspace 24, such as oxygen, nitrogen, and water vapor, concentrate in the shear layer, and soot and CO2 are expelled by centrifugation out of the shear layer and into the boundary layers. The arrows show the magnitude and direction of radial flows at various distances from the disks, with respect to the axis 91 in the workspace 24.

Figure 10:
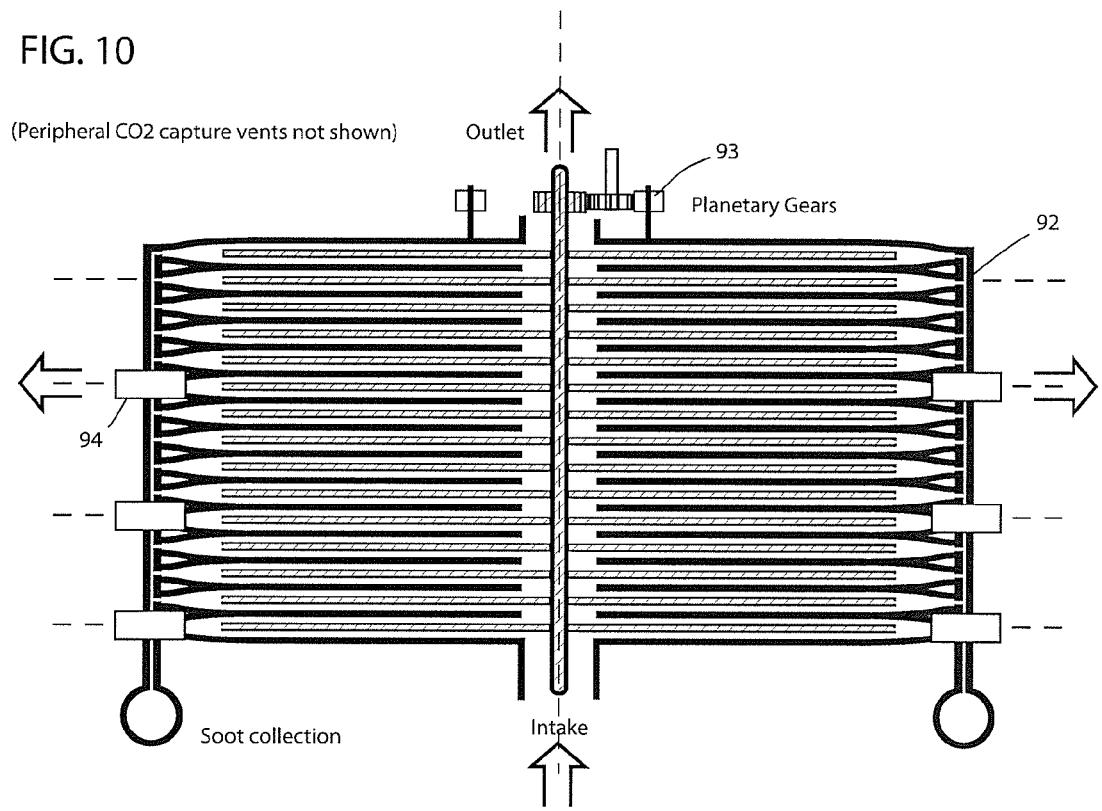
FIG. 10 shows a cross section of a cascade of disks where an early release of the exhaust stream into the environment can be made if the stream has been sufficiently cleaned or quieted.

FIG. 10 shows a cross section of a cascade of disks where an early release of the exhaust stream into the environment can be made if the stream has been sufficiently cleaned or reduced in noise. If the successive stages have produced an acceptable outlet after only a part of the stages have been used, a valve can be thrown and the outlet from the acceptable stage immediately released into the environment.

The vanes have been omitted from the representation for clarity. The central stack of disks are linked to a central shaft, and are turned together by a motor or other motive force. All of these components turning in the same direction have a hatched fill. The interspersed disks are linked together at their periphery in a rotating drum 92 with holes to allow for the escape of the heavy constituents. Planetary gears 93 drive the two assemblies in counter-rotation. Alternatively, only the central stack could move, and the others would be static.

The processing can be considered as being divided into four zones, rising from bottom to top. Escape valves 94 allow for the gases to exit the processor early, if they have been sufficiently cleaned.

The materials used for the stack of disks will likely vary according to their height in the stack. For instance, in the lowermost disks, where hot and corrosive gases are coming from the engine, resistant materials such as ceramics or specially coated metal can be used. For the disks in the highest parts of the stack, the temperature and corrosiveness of the gases is much lower, and sound muffling is more important, so flexible disks or disks made of energy-absorbing materials can be used to absorb vibrations, or mesh disks with soft coatings that are periodically replaced as part of oil change services. Particulates such as metals may adhere to the coatings.

Figure 11:
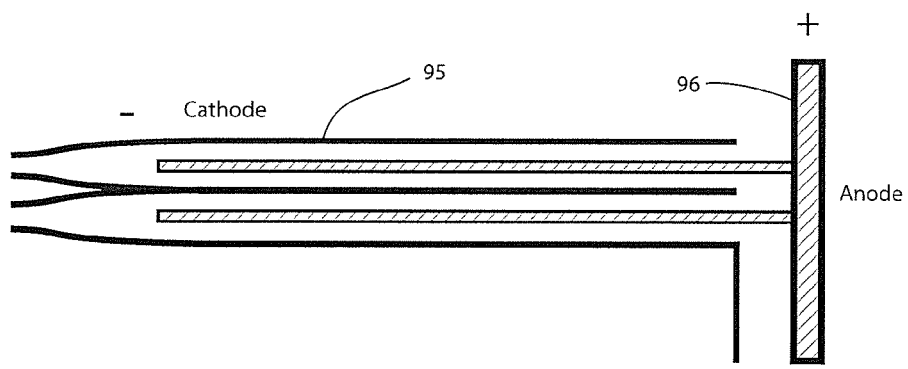
FIG. 11 shows a cross-section of a cascade of disks and their electrical charges.

FIG. 11 shows an example of the charging of the disks for cracking the component gases. In this case, the inner disks linked to a central shaft are all charged as anodes 95, and the interspersed disks are charged as cathodes 96. The electrical potential transferred into the workspace would be used to crack gases and molecules into their constituents.

This design can be used to treat many kinds of exhaust gas streams, including those from static engines, ships, and trains. Therefore, the scope of this disclosure should not be considered to be limited to the exemplary description herein.

The Applicants claim:

1. A muffler for attenuating acoustic pulses in a flow of exhaust gas from an internal combustion engine while simultaneously collecting soot, the muffler comprising:
   a plurality of disk pairs, each disk pair comprising a pair of self-propelled, rotatable coaxial disks, each disk pair positioned within a housing in a cascade configuration, the centers of each disk pair aligned with each other, and the plurality of disks structured to rotate about an axis of rotation defined along the aligned centers of the disks, each disk pair defining a radial workspace between them, the radial workspace having an axial feed port at the center of one of the disks and an axial extraction port at the center of the other disk;
   a baffle disposed between each disk pair, the respective baffles disposed between respective axial feed ports and axial extraction ports of each disk pair, the baffles and the disks structured to feed gas from each respective axial feed port, radially out from the axial feed port under the respective baffle and radially into the respective axial extraction port over the respective baffle, the gas exiting the workspace through each respective axial extraction port;
   vanes disposed on each disk and structured to drive each disk to rotate when the flow of gas across each disk engages the vanes;
   a housing disposed around the periphery of the plurality of workspaces such that soot advected out of the workspace impinges the housing;
   a soot collector for collecting the soot that impinges the housing; and
   a soot hopper for storing the soot.

2. The muffler of claim 1, further comprising electrolytic means for NO reduction.

3. The muffler of claim 1, wherein the edge of each the rotating disks is a cathode.

4. The muffler of claim 1, further comprising a motor structured to, in addition to the flow of gas across the disks, drive rotation of at least one of the disks.

5. The muffler of claim 4, wherein the motor is switchable between a power output state and a power generation state.

6. The muffler of claim 1, wherein the muffler is mounted to a vehicle having an internal combustion engine, and wherein motion of the vehicle generates a slipstream over a muffler outlet, the slipstream increasing gas advection through the muffler outlet.

7. The muffler of claim 6, further comprising a motor structured to, in addition to the flow of gas across the disks, drive rotation of at least one of the plurality of disk pairs.

8. The muffler of claim 1, wherein the advection of gas comprises a slip stream of a vehicle.

9. The muffler of claim 8, further comprising a motor connected to at least one of the plurality of disk pairs and the motor is structured to be switchable between a power output state and a power generation state.

10. The muffler of claim 1, wherein the plurality of disk pairs is disposed within a housing, the housing having vanes on its external periphery and the housing structured to induce counter-rotation of at least one of the plurality of disk pairs.

11. The muffler of claim 1, further comprising an electrostatic precipitator structured to attract soot to the soot collector.

12. The muffler of claim 1, wherein the disks are made of a flexible energy-absorbing material.

13. The muffler of claim 1, wherein the vanes have a radial configuration.

14. The muffler of claim 1, wherein at least one of the plurality of disk pairs are counter-rotatable.

15. The muffler of claim 1, wherein each of the plurality of disk pairs are co-rotatable.

16. The muffler of claim 1, wherein a motor is structured to drive the baffles in counter-rotation with respect to the rotation of the disks.

17. A muffler for attenuating acoustic pulses in a flow of exhaust gas from an internal combustion engine while simultaneously collecting soot, the muffler comprising:
- a plurality of disk pairs, each disk pair comprising a pair of self-propelled, rotatable coaxial disks, each disk pair positioned within a housing in a cascade configuration, the centers of each disk pair aligned with each other, and the plurality of disks structured to rotate about an axis of rotation defined along the aligned centers of the disks, each disk pair defining a radial workspace between them, the radial workspace having an axial feed port at the center of one of the disks and an axial extraction port at the center of the other disk;
- a baffle disposed between each disk pair, the respective baffles disposed between respective axial feed ports and axial extraction ports of each disk pair, the baffles and the disks structured to feed gas from each respective axial feed port, radially out from the axial feed port under the respective baffle and radially into the respective axial extraction port over the respective baffle, the gas exiting the workspace through each respective axial extraction port;
- a motor connected to the baffles of each of the disk pairs, the motor structured to drive the baffles to rotate about the axis of rotation of the disks
- vanes disposed on each disk and structured to drive each disk to rotate when a flow of gas across each disk engages the vanes;
- the housing disposed around the periphery of the plurality of workspaces such that soot advected out of the plurality of workspaces impinges the housing;
- a soot collector for collecting the soot that impinges the housing; and
- a soot hopper for storing the soot.

18. The muffler of claim 17, wherein the muffler is mounted to a vehicle having an internal combustion engine, and wherein motion of the vehicle generates a slipstream over a muffler outlet, the slipstream increasing gas advection through the muffler outlet.

19. The muffler of claim 17, further comprising a motor structured to, in addition to the flow of gas across the disks, drive rotation of at least one of the plurality of disk pairs.

20. The muffler of claim 19, wherein the motor is structured to be switchable between a power output state and a power generation state.

* * * * *